(12) United States Patent
Neuman et al.

(10) Patent No.: US 9,641,505 B2
(45) Date of Patent: May 2, 2017

(54) SECURE AUTHENTICATION IN A MULTI-PARTY SYSTEM

(71) Applicant: AUTHENTIFY, INC., Chicago, IL (US)

(72) Inventors: Michael Neuman, Coeur d'Alene, ID (US); Diana Neuman, Coeur d'Alene, ID (US)

(73) Assignee: Early Warning Services, LLC, Scottsdale, AZ (US)

( * ) Notice: Subject to any disclaimer, the term of this patent is extended or adjusted under 35 U.S.C. 154(b) by 0 days.

(21) Appl. No.: 14/630,169

(22) Filed: Feb. 24, 2015

(65) Prior Publication Data

US 2015/0237031 A1 Aug. 20, 2015

Related U.S. Application Data

(62) Division of application No. 13/852,003, filed on Mar. 28, 2013, now Pat. No. 9,203,841.

(Continued)

(51) Int. Cl.
*H04L 29/06* (2006.01)
*H04L 29/08* (2006.01)
(Continued)

(52) U.S. Cl.
CPC ........ *H04L 63/08* (2013.01); *G06F 17/30864* (2013.01); *H04L 9/30* (2013.01); *H04L 9/3247* (2013.01); *H04L 67/02* (2013.01)

(58) Field of Classification Search
CPC ......... H04L 63/08; H04L 9/30; H04L 9/3247; H04L 67/02; G06F 17/30864
See application file for complete search history.

(56) References Cited

U.S. PATENT DOCUMENTS

| 4,218,582 A | 8/1980 | Hellman et al. |
| 5,371,794 A | 12/1994 | Diffie et al. |

(Continued)

FOREIGN PATENT DOCUMENTS

| WO | 2007/129345 A1 | 11/2007 |
| WO | 2009/036318 A1 | 3/2009 |
| WO | 2011118871 A1 | 9/2011 |

OTHER PUBLICATIONS

Roland M. Van Rijswijk, et al, TiQR: a novel take on two-factor authentication (published Dec. 4, 2011, in the LISA'11 Proceedings of the 25th international conference on Large Installation System Administration).

(Continued)

*Primary Examiner* — Techane Gergiso
(74) *Attorney, Agent, or Firm* — Kilpatrick Townsend & Stockton LLP

(57) ABSTRACT

An authentication server transmits a random number to and receives a other information from a service provider. Later, the first random number is received from a requester and a provider identifier, the received other information and provider authentication policy requirements are transmitted to the requester. A user identifier and validation information are received from the requester. The received validation information is determined to correspond to the provider authentication policy requirements, and compared with stored user validation information associated with the received user identifier to authenticate the requester. A message, including both the random number and other information, signed with a credential of the requesting user is received and transmitted to the first provider.

21 Claims, 10 Drawing Sheets

Related U.S. Application Data

(60) Provisional application No. 61/645,252, filed on May 10, 2012, provisional application No. 61/618,813, filed on Apr. 1, 2012.

(51) Int. Cl.
*G06F 17/30* (2006.01)
*H04L 9/32* (2006.01)
*H04L 9/30* (2006.01)

(56) References Cited

U.S. PATENT DOCUMENTS

| | | | |
|---|---|---|---|
| 5,930,804 | A | 7/1999 | Yu et al. |
| 6,026,163 | A | 2/2000 | Micali |
| 6,490,624 | B1 | 12/2002 | Sampson et al. |
| 6,957,199 | B1 | 10/2005 | Fisher |
| 6,959,394 | B1 | 10/2005 | Brickell et al. |
| 7,231,657 | B2 | 6/2007 | Honarvar et al. |
| 7,457,950 | B1 | 11/2008 | Brickell et al. |
| 7,606,560 | B2* | 10/2009 | Labrou ............. G06Q 20/18 455/410 |
| 7,861,286 | B2 | 12/2010 | M'Raihi et al. |
| 7,900,242 | B2 | 3/2011 | Malinen et al. |
| 8,006,291 | B2 | 8/2011 | Headley et al. |
| 8,776,166 | B1* | 7/2014 | Erickson ............. H04L 63/083 726/1 |
| 2003/0084288 | A1 | 5/2003 | de Jong et al. |
| 2003/0093694 | A1 | 5/2003 | Medvinsky et al. |
| 2003/0115142 | A1 | 6/2003 | Brickell et al. |
| 2003/0163733 | A1 | 8/2003 | Barriga-Caceres et al. |
| 2004/0019564 | A1 | 1/2004 | Goldthwaite et al. |
| 2004/0225898 | A1 | 11/2004 | Frost et al. |
| 2005/0015601 | A1 | 1/2005 | Tabi |
| 2006/0048216 | A1 | 3/2006 | Hinton et al. |
| 2006/0129816 | A1 | 6/2006 | Hinton |
| 2006/0129817 | A1 | 6/2006 | Borneman et al. |
| 2006/0156385 | A1* | 7/2006 | Chiviendacz ............. G06F 21/36 726/2 |
| 2006/0174104 | A1 | 8/2006 | Crichton et al. |
| 2006/0200854 | A1 | 9/2006 | Saito |
| 2007/0044146 | A1 | 2/2007 | Murase et al. |
| 2008/0010678 | A1 | 1/2008 | Burdette et al. |
| 2008/0222706 | A1 | 9/2008 | Renaud et al. |
| 2009/0031125 | A1 | 1/2009 | Bjorn |
| 2009/0089869 | A1 | 4/2009 | Varghese |
| 2009/0158034 | A1 | 6/2009 | Gu et al. |
| 2009/0241175 | A1 | 9/2009 | Trandal et al. |
| 2010/0070759 | A1 | 3/2010 | Leon Cobos et al. |
| 2010/0115578 | A1* | 5/2010 | Nice .................. G06F 21/31 726/1 |
| 2010/0138899 | A1 | 6/2010 | Yamamoto et al. |
| 2010/0241857 | A1 | 9/2010 | Okude et al. |
| 2011/0072274 | A1 | 3/2011 | Leoutsarakos et al. |
| 2011/0107407 | A1 | 5/2011 | Ganesan |
| 2011/0119747 | A1 | 5/2011 | Lambiase |
| 2011/0145899 | A1 | 6/2011 | Cao et al. |
| 2011/0179472 | A1 | 7/2011 | Ganesan |
| 2011/0185405 | A1 | 7/2011 | Ganesan |
| 2011/0219427 | A1 | 9/2011 | Hito et al. |
| 2011/0231911 | A1* | 9/2011 | White .................. G06F 21/32 726/7 |
| 2011/0246764 | A1 | 10/2011 | Gamez et al. |
| 2011/0265149 | A1 | 10/2011 | Ganesan |
| 2011/0283340 | A1 | 11/2011 | Ganesan |
| 2011/0289316 | A1 | 11/2011 | Cremin et al. |
| 2012/0042363 | A1 | 2/2012 | Moosavi et al. |
| 2012/0066501 | A1 | 3/2012 | Xiong |
| 2012/0124651 | A1 | 5/2012 | Ganesan et al. |
| 2012/0143759 | A1* | 6/2012 | Ritorto, Jr. ............. G06Q 20/02 705/44 |
| 2012/0192255 | A1 | 7/2012 | Ganesan |
| 2012/0233684 | A1 | 9/2012 | Denis et al. |
| 2012/0272056 | A1 | 10/2012 | Ganesan |
| 2013/0117824 | A1 | 5/2013 | Naslund et al. |

OTHER PUBLICATIONS

Ben Dodson, Debangsu Sengupta, Dan Boneh, Monica S. Lam, Snap2Pass: Consumer-Friendly Challenge-Response Authentication With a Phone (posted on Mar. 30, 2010, at http://prpl.stanford.edu/papers/soups10j.pdf).

Paul C. van Oorschot et al., Authentication and Authenticated Key Exchanges, Authors: Diffie, Oorschot & Weiner, Published by Designs, Codes & Cryptography 2, 107-125, .COPYRGT.1992 Kluwer Academic Publishers.

Written Opinion issued in Singapore Application No. 11201405282R dated Jul. 1, 2015.

Communication dated Apr. 28, 2016 from the European Patent Office issued in corresponding Application No. 13771854.0.

Communication dated Jan. 20, 2016, issued by the European Patent Office in corresponding European Application No. 13771854.0.

Tanaka et al., "A Method and Its Usability for User Authentication by Utilizing a Matrix Code Reader on Mobile Phones", Information Security Applications; [LNCS], Aug. 28, 2006, pp. 225-236.

* cited by examiner

SECURE AUTHENTICATION IN A MULTI-PARTY SYSTEM

RELATED APPLICATIONS

The present application a divisional of U.S. patent application Ser. No. 13/852,003, filed Mar. 28, 2013, which claims priority on Provisional Application No. 61/618,813, filed on Apr. 1, 2012, and on Provisional Application No. 61/645,252, filed on May 10, 2012, the entire contents of both of which are incorporated herein by reference.

FIELD OF INVENTION

The present invention relates to authentication. More particularly it relates to securing and simplifying multi-level authentication in a multi-party system.

BACKGROUND

Internet authentication is currently based on passwords for authentication, even though passwords and password systems are insecure, easy to crack, guess, and subvert. Password security relies on 1) users remembering their password and 2) attackers not gaining access to the password. Since more secure passwords are hard to remember, common passwords like "12345" are used by huge percentages of the users on the Internet. Other solutions have been tried to increase the security of the system including One Time Passwords (OTP), which use an out of band method (typically the user typing in a code or a setup process taken before the token generator is shipped) to create one time tokens that are time based. Until recently OTPs have been generated by hardware tokens and were expensive to supply to users. Recent improvements have allows OTP to be distributed as software applications on mobile devices which are initialized by the user filling out some seed numbers. Although OTP provide protections from guessable passwords and brute force attacks they are still susceptible to a number of attacks like being re-used within the window and stolen (if the seed material is stolen the OTP can be generated by anyone). Another stronger security option is Public Key Infrastructures (PKI) which rely on public/private key pairs which is a huge benefit as the "secret" data (i.e. the private key) never leaves the user's control; but PKI systems are typically so complicated to implement that they are only used in huge organizations and cause numerous overhead problems like key revocation, provisioning each user, and managing keys when they expire etc.

In addition to increasing the security of authentication a better authentication system should make it easier for the user. Common security improvements like OTP, PKI, using additional security questions, making passwords longer, etc. make it more complicated on the user. Ideally, users would both be able to use the system in a simplified manner but would also be given control over their authentication data to prevent fraud and to select different strengths of authentication based on their own preferences. With the expanded capabilities of smart phones and other user devices, it is now possible to transfer session/authentication data between channels, for example between the browser and the smart phone, this can enable stronger security authentication.

SUMMARY OF INVENTION

According to certain aspects of the invention any of multiple different users can be authenticated to any of multiple different network service providers via the network, e.g. the Internet, by an authentication server. To do so, the authentication server is operated to store validation information, including for example a password, other knowledge based data, a token and/or biometric data, for each user in association with an identifier of that user. The authentication server also stores authentication policy requirements of each of the multiple different service providers in association with an identifier of the applicable provider. Such authentication requirement policies typically mandate the type or types of authentication factors, including the types of validation information and credentials, that the service provider requires be used for authentication of a user seeking access to certain information available on the service provider's network site. Those skilled in the art will recognize that a single service provider may have different authentication policy requirements for different levels of access. It should also be understood that the authentication requirement policies of a particular provider may not require that any type of validation information be provided by a user.

To authenticate a user to a provider, the authentication server receives a request for information, most typically and for purposes of the description below a random number, from the provider via the network and, in response, transmits a random number to the provider via the network. Preferably, the random number serves as a session identifier. It should be understood that the authentication server could, if desired, transmit multiple random numbers to the provider in response to a single request.

The authentication server receives other information, which could also be a random number, from the provider via the network. This other information is sometimes referred to as a liveness identifier.

After transmitting the random number to the service provider, the authentication server receives, from a requesting user via the network, the random number and a request to be authenticated. The messaging protocol could be easily modified, as will be recognized by those skilled in the art, such that the provider could also initiate login by sending the random number and a user ID to the authentication server. In response, the authentication server transmits the stored provider identifier, received other information and the stored provider authentication policy requirements to the requesting user via the network. The authentication server receives, in response, a user identifier and, optionally depending on whether or not the transmitted authentication policy requirements require validation information, validation information, e.g. having a password, other knowledge based data, a token and/or biometric data, from the requesting user via the network.

The authentication server then matches the received user identifier to the applicable stored user identifier, determines that any validation information from the requesting user corresponds to the stored provider authentication policy requirements, i.e. that the types of validation information required by the policy have been received from the requesting user, and compares any received validation information with the stored applicable user validation information to authenticate that the requesting user is the applicable user, i.e. that the user is who the user says he/she is.

The authentication server receives a message, including the random number and the other information, signed with a user credential from the requesting user via the network. The authentication server then transmits a notice of authentication of the user and the signed message to the provider via the network.

Preferably, the authentication server receives the user's credential(s) from each applicable user via the network, and stores the received user credential(s) in association with the applicable user identifier. If so, the authentication server can beneficially verify the random number and the other information by applying the applicable stored user credential to the received signed message to further authenticate the requesting user as the applicable user. It should be understood that each user may have a single credential or many different credentials. For example, one user may have a single user credential that is used with multiple different service providers with whom the user transacts business of whatever nature. On the other hand, another user may have a different respective user credential that is used with each service provider with whom this user transacts. Indeed the user may have different user credentials for accessing different information at the network site of the same service provider, if so desired.

In a particularly preferred implementation, the stored user credential is the public key of a private/public key pair of the applicable user. The received user credential is a private key of the applicable user private/public key pair, which is known only to that user, and the received signed message is signed with the private key. In such a case, the authentication server transmits a certificate, which includes the applicable user's public key and is signed with the private key of a private/public key pair of the authentication server, with the notice of authentication and the received signed message. As with other types of user credentials, a particular user may use a single private/public key pair to authenticate to multiple different service providers or may use a different private/public key pair to authenticate to each of multiple different service providers.

Advantageously, the authentication server receives, from each user via the network, and stores a first of multiple portions of secret data of the applicable user. The secret data could, for example, be an extended and/or hashed password. After authenticating that the requesting user is the applicable user, based on the applicable validation information (if any), it then transmits the applicable stored first portion of secret data to the requesting user via the network, and the signed message is received after transmission of the first portion of secret data.

Accordingly to other beneficial aspects of the invention, the authentication server may receive a request for a random number and receive other information from the provider via the network, similar to the that previously described and, in response, transmits a random number to the provider via the network. Here, the random number serves as an enrollment session identifier. After transmitting the random number to the service provider, the authentication server receives, from a requesting user via the network, the random number and a request to be enrolled at the service provider. In response, the authentication server transmits the stored provider identifier and the stored provider authentication policy requirements to the requesting user via the network. The authentication server receives, in response, a user identifier and, optionally depending on whether or not the transmitted authentication policy requirements require validation information, validation information, having a password, other knowledge based data, a token and/or biometric data, from the requesting user via the network; and a new credential for use between the user and the service provider. In the case where the credential is a public/private key pair the public key is transmitted to the authentication server with a certificate signing request. The authentication server then matches the received user identifier to the applicable stored user identifier, determines that any validation information from the requesting user corresponds to the stored provider authentication policy requirements, i.e. that the types of validation information required by the policy have been received from the requesting user, and compares any received validation information with the stored applicable user validation information to authenticate that the requesting user is the applicable user, i.e. that the user is who the user says he/she is. If the user credential is a public/private key pair, the authentication server transmits to the user the signed certificate.

The authentication server transmits the received other information to the requesting user via the network and receives a message, including the random number and the other information, signed with the new user credential from the requesting user via the network. The authentication server then transmits a notice of enrollment of the user, user credential, and the signed message to the provider via the network.

Accordingly to other beneficial aspects of the invention, the authentication server may receive, from the applicable user, a notice that the user's credential has been compromised. If so, the authentication server invalidates the applicable stored user credential in response to the received notice. Invalidation can be performed in various ways, including deletion of the credential or flagging the credential as invalid.

For example, after invalidating the stored user credential used in the authentication discussed above based on such a notice, the authentication server may receive, via the network, another request for a random number from the provider for whom the authentication discussed above was performed. In response, the authentication server will transmit another random number, which will be referred to below in this section as a second random number, to the provider via the network. The authentication server will also receive, via the network, further other information, which will be referred to below in this section as second other information, from the provider. It additionally receives the second random number and a request to be authenticated from a requesting user via the network.

The authentication server will again transmit, in response to receipt of the second random number and authentication request, the stored provider identifier, the received second other information, and the stored provider authentication policy requirements to this requesting user via the network. In response to the again transmitted provider authentication policy requirements, the authentication server receives another user identifier and, optionally depending on whether or not the again transmitted authentication policy requirements require validation information, other validation information, e.g. having a password, other knowledge based data, a token and/or biometric data, from this requesting user via the network.

The authentication server then matches the received other user identifier to the same stored user identifier as above (i.e. the identifier of the same user as authenticated above), determines that the other validation information, if any, from this requesting user corresponds to the same stored provider authentication policy requirements as above, and compares any received other validation information with the applicable stored user validation information to authenticate that this requesting user is the same user as authenticated above. However, here, the authentication server further determines that the applicable stored user credential, which was valid to authenticate the user to this same service provider prior to the authentication server receiving the notice that the user's credential has been compromised, is now invalid.

After determining that the applicable stored user credential is invalid, the authentication server can proceed in various ways. The authentication server may transmit, to the provider via the network, a notice of authentication, e.g. based on received validation information, that the requesting user is the same user as above, but also a notice of the authentication server's inability to further authenticate the applicable user due to the invalidity of the user credential.

Additionally, or alternatively, after determining that the stored requesting user credential is invalid, the authentication server may transmit a request for a replacement credential to the requesting user via the network. In response, the authentication server receives a replacement credential from the requesting user via the network, and stores it. If the received credential is a public key, the authentication server may then generate a certificate for the received user replacement credential, and transmit it to the requesting user via the network, for use by this user in re-enrolling with the provider.

Further still, after receiving the replacement credential, the authentication server may beneficially receive, from the requesting user via the network, another message, including the second random number and second other information, signed with a credential by the requesting user. The authentication server verifies the second random number and the second other information by applying the stored replacement credential to the received signed other message to further authenticate the requesting user as the same user (i.e. the same user that was first authenticated above). It also transmits, to the provider via the network, notice of authentication of the requesting user and the signed other message.

As noted above, the same user may have different credentials for authenticating to different service providers. If this is the case for the user authenticated above, the authentication server also receives, from this same user (i.e. the same user as that authenticated above) via the network, another credential of this user, and stores the received other credential and, optionally, this same user's validation information in association with another identifier for this user. The authentication server also stores authentication policy requirements of another of the multiple service providers, in association with an identifier of this other provider.

The authentication server then receives, from this other provider via the network, another request for a random number. In response, the authentication server transmits still another random number, which will be referred to below in this section as a third random number, to this other provider via the network. It also receives, from this other provider via the network, still further other information, which will be referred to below in this section as third other information.

The authentication server receives, from a requesting user via the network, the third random number and a request of this requesting user to be authenticated. In response, the authentication server transmits the stored other provider identifier, the received third other information, and authentication policy requirements of this other provider, to this requesting user via the network.

In response to the transmitted other provider authentication policy requirements, the authentication server receives another user identifier and, optionally depending on whether or not the transmitted other provider authentication policy requirements require validation information, other validation information, e.g. having a password, other knowledge based data, a token and/or biometric data, from this requesting user via the network. It then matches the received other user identifier to the stored other user identifier, determines that any other validation information received from this requesting user corresponds to the stored other provider authentication policy requirements, and compares the received other validation information with the applicable stored user validation information to authenticate that this requesting user is the same user as that authenticated above.

The authentication server receives, from this requesting user via the network, another message, including the third random number and the third other information, signed with a credential. The authentication server optionally verifies the third random number and the third other information by applying the stored same user other credential to this received signed other message to further authenticate that this requesting user is the same user. It then transmits, to the other provider via the network, notice of authentication of the requesting user and the received signed other message.

According to still other preferred aspects of the invention, the authentication server can receive from users via the network, and store, user authentication policy requirements. In such case, the authentication server can then compare the applicable stored provider authentication policy requirements with the applicable stored user authentication policy requirements, and determine any additional authentication policy requirements required by the user based on the comparison. The authentication server transmits any determined additional authentication policy requirements, with the transmitted provider identifier and provider authentication policy requirements, to the requesting user via the network. The authentication server must also determine that the validation information received from the requesting user corresponds to any transmitted additional authentication policy requirements to authenticate the user.

In accordance with still other aspects of the invention, an authentication server is operated to notify a first network entity, e.g. a user, of a transaction via a network, by receiving an identifier of the first network entity, a transaction identifier, transaction approval and authentication requirements, and a message regarding the transaction, which could for example include the transaction details, from a second network entity, e.g. a service provider, via the network. The message is encrypted with a credential of the first network entity. If the credential is a public key of a private/public key pair of the first network entity, the private key of the first network entity private/public key pair is known only to that network entity. The message is also signed with a private key of a private/public key pair of the second network entity. The public key of the second network entity private/public key pair is known to the first network entity.

The authentication server transmits the received transaction identifier, transaction approval and authentication requirements, and encrypted signed message to the first network entity via the network. In response, it receives a transaction approval, or authentication information such as validation information and/or a credential, or both, from the first network entity via the network, depending is what is required. It then determines, based on any received authentication information, that the first network entity is authentic. The authentication server transmits, to the second network entity via the network, a notification of the determination or the received transaction or both.

It should be understood that the above described aspects of the invention can be implemented using logic, for example in the form of software, such as a programmed application or app, stored on non-transitory storage medium, such as a hard, compact or other type disk, or memory, which is configured to be readable by a processor and thereby cause the processor to operate so as to perform the functions and/or operations described above. It should also be understood that the above described aspects of the invention can be implemented on a network server, including multiple servers in a cluster, having a processor configured with the logic to perform the functions and/or operations described above and a data store, e.g. disk or memory, configured to store data as directed by the processor.

Additional objects, advantages, and novel features of the present invention will become apparent to those skilled in the art from this disclosure, including the following detailed description, as well as by practice of the invention. While the invention is described below with reference to particular embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

BRIEF DESCRIPTION OF DRAWINGS

Each of these drawings represents an example embodiment of the systems they are depicting.

DETAILED DESCRIPTION

Overview

First Authentication Framework

Figure 1:
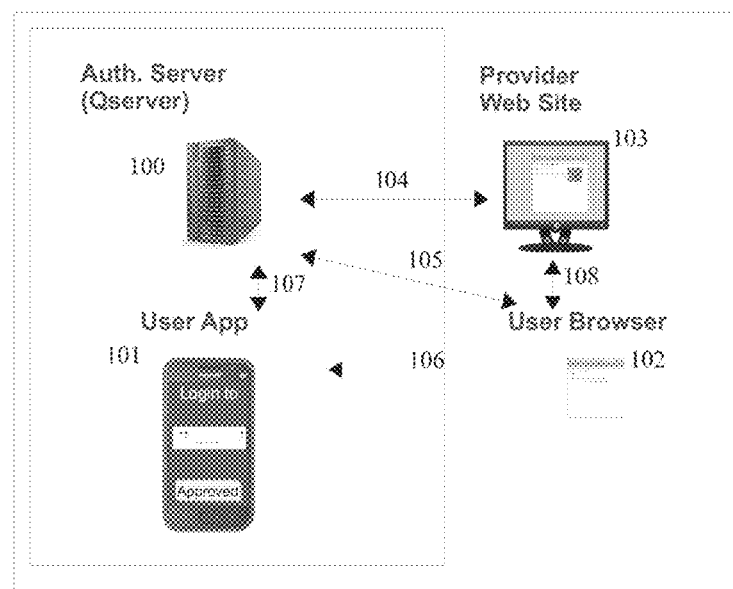
FIG. 1. Illustrates the main architectural components.

According to aspects of the invention provides an authentication framework, see FIG. 1, that includes a mobile device of the user which has a network connection, e.g. a smart phone 400 or tablet, and a software application capable of executing various cryptographic and authentication operations 101. A network service 103, like a web site or terminal server, is also included. Access software is used to reach the network service, like a web browser 102, that may reside on the mobile device or on a secondary device like a desktop or laptop. The access software may have a trusted component which can reliably send security data to the user's mobile device including information to validate that credentials being provided by the user are for the current network service. The trusted component of the access software may be a browser plug-in. Additional security information, provided by the trusted component, may include the network service's address or URL (in the case of a web service). An authentication server 100 is attached to a network and reachable by the network service, the access software and the mobile device.

A first transfer connection 106 between the access software and the mobile device software, like a scanned QR code or near field communication system, is used to transfer an authentication session identifier (ID), and may include additional information for session startup. The first transfer connection may be augmented by a more complete communication channel (for example Bluetooth, near field radio, USB connection, etc.) allowing validation between the access software and the mobile software application that they are connecting to the same network service. The session ID received on the first transfer connection may be transferred via optical display of a QR code. If so, evaluating the session ID may include reading the QR code with a camera and decoding the QR code.

A second transfer connection 107 between the mobile device software and the authentication server that performs the transfer of security checks for liveness of the session, and checks credentials of the user and the network service. The authentication server may include a fraud and anomaly detection system 504. The credentials of the user may be based on a asymmetric public key cryptography using a public/private key system and the credentials of the user may be specific to the network service being accessed.

If a public/private key system is used during authentication, it may include a set of communication keys/certificates which allows authentication between the authentication server and the network service and between the authentication server and user mobile software. It may also include a set of user validation keys/certificates which allows authentication between the user and the network service. The set of user validation keys may also include user-to-user validation keys, and a single key/certificate for use across multiple services, or a unique key for every user-service pairing.

Additionally, the authentication server could be used to validate authentication data, and determine the process for dealing with expired, lost or otherwise invalid certificates. The authentication server may also perform fraud detection and auditing. Finally, one or more certificate signing authorities could be included and used by the authentication server to approve certificates. Preferably, three signing certificate authorities would be used: one for network service credentials, one for user to network service credentials, and one for user to authentication server credentials. The process for handling lost credentials may include invalidating the lost credentials.

The security checks may further include additional authentication factors such as biometric data, token based authentication data, or additional knowledge based factors. If biometric data is one of the factors, it could include hand recognition using a camera on the device, biometric data collected from devices attached to the user mobile device, fingerprint recognition using a USB fingerprint scanner. The additional authentication factor(s) used could include knowledge based question(s), such as a password and/or personal identification number (PIN), or a verifiable property like a pre-registered phone number. The additional authentication factor(s) used could include tokens either on or attached to the mobile device, such as a smart card read through an attached card reader, a secure data token accessed through near-field radio, and/or data read from the SIM card of the mobile device.

A third transfer connection to the access software allows the access software to know when the user authentication has been completed, and may be between the access software and either the authentication service 105 or the network service 108. The access software may automatically transfer to a logged in state when the authentication is complete.

Second Authentication Framework

This authentication framework includes a variety of services and users of those services across a network, which have a variety of credentials allowing users to communicate. The users could be automated processes instead of people Also included are authentication data indicating which user-service credentials are valid, lost, or expired and usable to determine if logins are allowed. A system is provided for communicating between parties, and may include traditional network protocols, proxies, or reverse proxies.

One or more hierarchical authentication server(s) are also provided, with the top tiers of the hierarchical authentication server(s) capable of redirecting individual requests for authentication to lower levels or tiers based on the services being authenticated. Each authentication server, using the authentication data, can make determinations as to if user credentials are still valid. The hierarchical authentication server(s) may be a single level of server where one server or cluster of servers handles authentication requests. A lower tier server could, if desired, reside behind a firewall or perimeter network gateway and handle services on the local or organizational network. Logins may, for example, be denied because credentials have been marked as lost and so are no longer valid.

Third Authentication Framework

This authentication framework includes an authentication server attached to a network and reachable network service, like a website or terminal server. Also included is a set of user credentials on the authentication server, some of which may be marked as invalid because, for example, the device they resided in was lost.

Access software is used to reach the network service. A communication system between the network server and the authentication server tells the network service that the user is valid but the individual credentials are invalid or do not exist. The communication system may be a method query within an API object returned from the authentication server or a custom protocol that returns the validity of the credentials.

A simplified method is implemented to redirect the access software to an enrollment or alert page for additional validation. The simplified redirection method may be a web redirect message to an enrollment page, or an inter-application communication, like an Android intent to start a custom application for enrollment. The user may be redirected because they need to enroll on the site or to re-enroll on the site, in which case the user enrollment information could be filled in with pre-configured identity information as approved by the user. See FIG. 8. User identity information may be stored on a user mobile device 806, or on the authentication server. The identity information may be pre-grouped into sets of identity allowing the user to have multiple-identities (business, personal, etc.) and select between them.

Data Securing System

Figure 6:
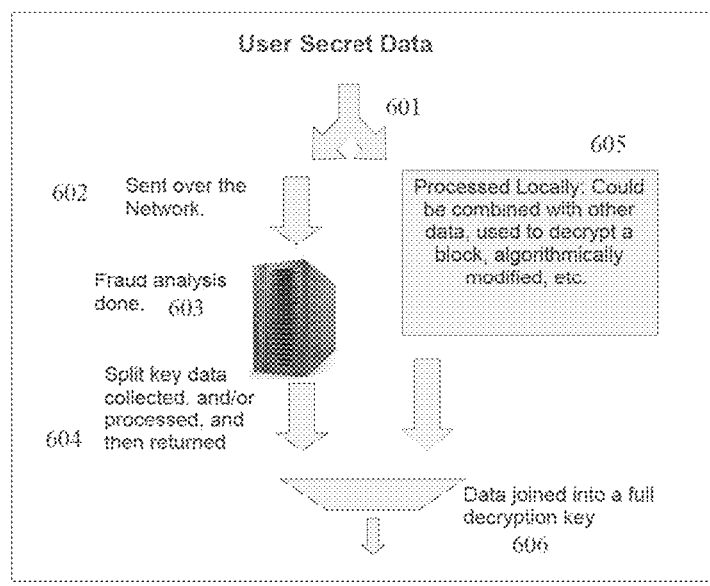
FIG. 6. Illustrates the split key system and the high-level data flow.

Also provided is a system for securing data on a mobile device that includes an encrypted data storage location (keystore or datastore) which uses a symmetric key for encryption and decryption, see FIG. 6. User entered secret data is divided into multiple parts 601, where one portion of the user entered secret data is used locally to obtain the first portion of the symmetric decryption key 605. The user entered secret data may be a password or passphrase, a biometric template or match, or an image drawn by the user. A network reachable server uses a second portion of the user entered secret data to retrieve the second portion of the symmetric key for decryption 604. For example, half of the password may be combined with system level data to obtain a half of the decryption key, such as by using that half of the password to decrypt a local block of data containing the half of the decryption key. A fraud detection policy on the network server 603, which may for example limit the number of failed login attempts, alarms or responds to suspicious requests for the second portion of the decryption key.

Authentication Server

Figure 7:
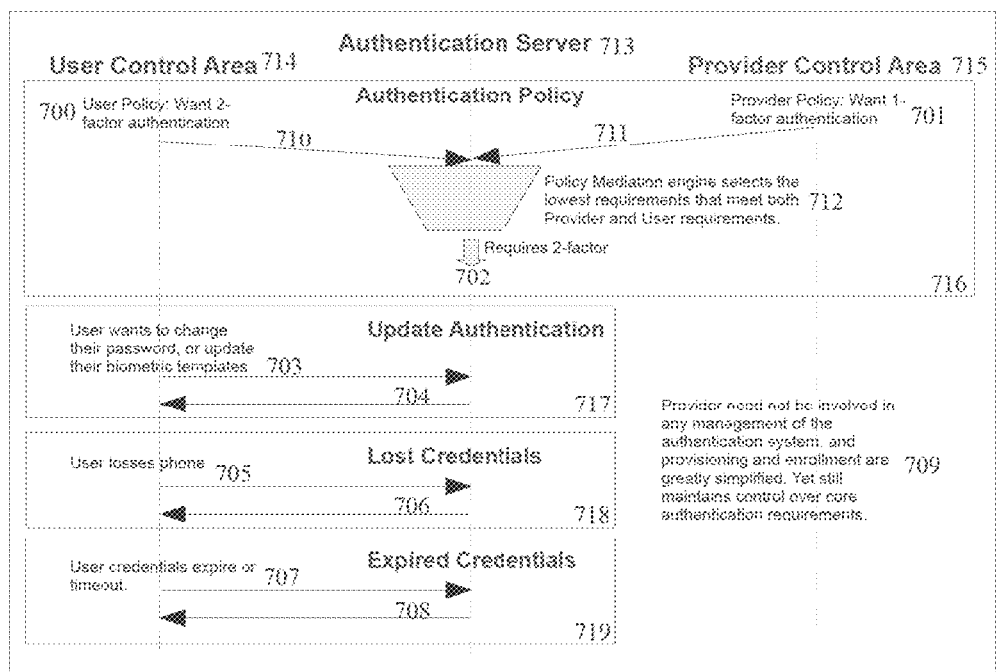
FIG. 7. Illustrates the sample interactions between the use, the authentication server, and the provider.

See FIG. 7, also provided is an authentication server 713 that includes a set of data relating to each user specifying which services they have credentials with, what type of authentication is required for access, and if the credentials are valid. A minimum security policy is specified by each of the services using the authentication sever 711. Policy management software 700 allows users to update their own records to (i) modify the types of authentication required to access a particular service or set of services as long as it meets the minimum specifications of the service, (ii) delete their credentials, or (iv) otherwise interact with their user data. The policy management software may reside on the user's mobile device or on a web site accessed by the user. The modification could include adding a new factor of authentication (for example specifying that login requires a face as well as a PIN), or changing the factor to be more accurate or restrictive (for example use face recognition instead of a hand recognition).

Fourth Authentication Framework

According to aspects of the invention, an authentication framework includes a mobile device of the user which includes a network connection and a software application capable of executing various cryptographic and authentication operations. A network service, like a web site or terminal server, is also included. Access software is used to reach the network service, like a web browser, that may reside on the mobile device or on a secondary device like a desktop or laptop. An authentication server attached to a network and reachable by the network service, the access software and the mobile device. If desired, the authentication server can include a fraud and anomaly detection system. See FIG. 9. An identifier 902 is supplied to the browser and uniquely identifies the mobile device's software application. The identifier could be a unique value per user like a phone number or user name.

A first connection between the mobile device software application and the authentication server performs the transfer of security checks for liveness of the session, and credentials of the user and the network service. The credentials of the user may be based on asymmetric public key cryptography using a public/private key system, and the credentials could be specific to the network service being accessed. The security checks may further include additional authentication factors including: biometric data, token based authentication data, or additional knowledge based factors. The biometric data could be collected from devices attached to the user mobile device A second connection to the access software allows the access software to know when the authentication has been completed. The second communication channel may be between the access software and the authentication service, or between the access software and the network service.

Fifth Authentication Framework

This authentication framework includes a mobile device of the user which has a network connection and a software application capable of executing various cryptographic and authentication operations. A network service, like a web site or terminal server, is also included. Access software is used to reach the network service, like a web browser, and may reside on the mobile device or on a secondary device like a desktop or laptop. An authentication server is attached to a network and reachable by the network service, the access software and the mobile device. Means are provided to uniquely tie the browser session to the mobile device's software application. These means may be communicated from the browser to the software application via an optical code, such as via optical display of a QR code. Processing this communication could include reading the QR code with a camera and decoding the QR code.

A first connection between the mobile device software application and the authentication server performs the transfer of security checks, credentials of the user and the network service, and provides a secure messaging channel. The secure messaging channel may be (i) a unidirectional communication means from the network service to the mobile device software application, or (ii) a bidirectional communication means for the network service to query additional information from the mobile device software application. The secure messaging channel may have a defined messaging protocol which includes the ability to transmit one or more of encrypted message data, approval requests, or policy information.

A second connection to the access software allows the access software to know when the authentication has been completed.

Authentication Enrollment System

Figure 10:
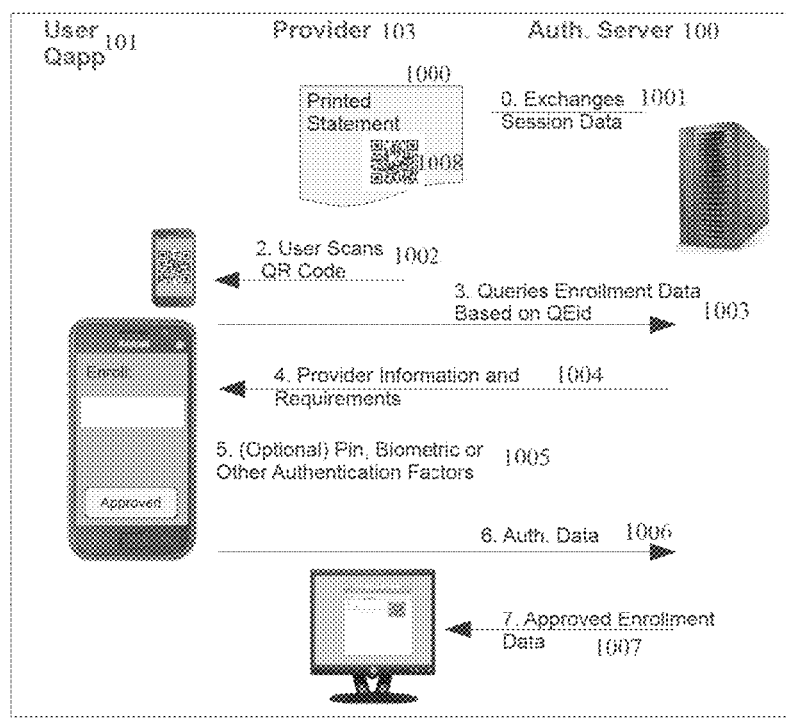
FIG. 10. Illustrates a sample paper based enrollment process.

An authentication enrollment system includes a mobile device of the user which has a network connection and a software application capable of executing various cryptographic and authentication operations. See FIG. 10. A printed document 1000 related to an individual account related to a network service, which includes the code 1008 to uniquely identify the enrollment session, is also included. An authentication server is attached to a network and reachable by the mobile device software application and the network service. Means are included to uniquely identify the enrollment session to the mobile device's software application. The means may be communicated from the printed document to the software application via an optical code including a QR code, processing the communication may include reading the QR code with a camera and decoding the QR code.

A first connection between the mobile device software application and the authentication server that performs the transfer of security checks and authentication of the user. A second connection to the network service allows the network service to know when the enrollment has been completed.

DESCRIPTION OF EMBODIMENTS

Multiparty Authentication System

A multi-party authentication system which uses an essentially un-trusted authentication provider 100 to validate users to network service providers 103. The system involves a trusted user device, like a mobile tablet or smart phone 400, that secures and holds the various user credentials (for example public/private keys and certificates); and can collect a variable number and type of authentication credentials including biometric, knowledge based (i.e. passwords), and token based. The authentication service 100 provides user driven provisioning and controls allowing real-time scalable authentication across a WAN and allows lost key recovery and simplified enrollment or re-enrollment.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. Those of ordinary skill in the art will appreciate that other embodiments, including additional devices, or combinations of illustrated devices, may be added to, or combined, without limiting the scope to the embodiments disclosed herein.

The present invention is based on a multi-party system (the user, the authentication service provider 100, and the network service provider 103) and includes the following main architectural components (see FIGS. 1 through 5 for views of the architectural components):

A user mobile device 400 which includes a network connection 402, data input system 401, and a software authentication application or app (Qapp) 101 which allows various authentication functions to be done. The Qapp 101 manages the authentication communication 409, collects extra authentication data 403 and 404, and stores user credentials and data 405 through 408. User mobile devices can be any personal device including smart-phones, tablet computers, laptop, etc. One embodiment is to use a Smart phone which includes both cellular based networking and WiFi networking. A second embodiment of a mobile user device might be a specialized authentication device. Ideally the user mobile device also includes additional sensors 404 (like a camera, microphone, etc.) which can be used to collect biometric 404 or additional token data 403.

A network service provider 103 (Provider), which has information that the user is required to login to access. The Provider's main role during authentication is to map users to the correct Provider account. Optionally the Provider can re-verify authentic credentials and perform other security checks. One embodiment is a web site 103 like an eBanking web site which allows the user to login to gain information about their account. A second embodiment might be a network enabled desktop login (like a Windows login screen).

A user's network service access software. This is the software the user interacts with to login via communications channel 108. For web sites the access software is the web-browser 102, other types of network services might have specialized access portals. Ideally, it would have the ability to transfer a set of data between the access software and the authentication application on the mobile device. See FIG. 2. One embodiment is to show a visual QR code 200, a 2 dimension bar code system, other options include audio codes, near field radio communications, etc. For the remaining description we have assumed a QR code is used for transferring information in the first channel 106 (i.e. between the access software (i.e. browser) and the authentication application). In at least some implementations, the network service should be capable of collecting a unique user ID. See FIG. 9. Sample embodiments might include i) the user directly entering the data into a field on the web site 902, ii) the ID being stored in a cookie or other browser storage location, or iii) from a communication means with the user's mobile device (attached USB, nearfield, etc.) where the user's mobile device then provides the unique user ID.

An authentication server 100 providing a variety of services (Qserver). The Qserver acts as an intermediary PKI management portal ensuring that various user and Provider credentials are correctly setup and used including 501 and 505; it handles additional forms of authentication 502 including biometric and token based options; it allows users to manage their own authentication including reporting lost phones or upgrading authentication through a policy mediation system 503; optionally, it manages user identities; and it does fraud detection 504 on authentication requests and authentication data used. In one embodiment the authentication server is a single Internet reachable host 500 or cluster of servers allowing network connected devices to connect, via communications channels 104, 105, and 107 and managed by 506, that requests or sends a variety of information. In a second embodiment the authentication server may consist of a hierarchy of servers allowing decision on authentication to flow between servers. In this embodiment the lower level server may provide authentication services to an organizational or corporate network behind firewalls or other network and security boundaries. In one embodiment the Qserver is housed on a server separate from the Provider to limit the security risks of losing authentication data.

Because the roles of each party spread the trust throughout the system, if one party is compromised risks to the entire system can be limited. See FIG. 7. For example one strength of the present invention is that if the user losses their mobile device the credentials can easily be revoked 705, credentials may also require the user to enter secret data (like a password) to access—which can be audited, and secure sites will require biometric data to access. In addition, none of these controls requires Provider intervention or modifications. Another security benefit is that during phishing attacks the user authentication data is never transferred to the Provider (or pretend Provider) so no credentials can be stolen. Finally, if the Qserver is compromised; because the Qserver does not have access to user private credentials, an attacker even with all of the data from the Qserver, cannot become a user or gain any additional access to a Provider. Further, because the authentication server acts as an authentication gateway, many events within the system can happen completely transparently or behind the scenes for the user. For example re-enrollment to a provider after a mobile-device is lost can happen without any addition interaction on the part of the user. It is also possible for one embodiment of the authentication server system to actually consist of a set of authentication servers, some of which reside on organizational networks behind firewalls or other perimeter devices, and authentication requests are coordinated between the servers to decide based on the network service provider being accessed which specific authentication server should be responsible.

FIG. 7 depicts the some of the user controls and management areas 714 and 715 possible. The first section 716 illustrates the policy mediation done at the authentication server 713 where user policies 700 for how much authentication is desired to access a particular provider communicated to the server over 710 are analyzed with the provider's own policies 701 communicated over 711 to create the ultimate requirements 702 for the user to access the provider's site. The next three sections 717, 718, and 719 respectively show that if the user wants to change their password 703, losses their credentials 705, or the credentials expire 707 it is not an activity that requires the provider be involved 709. The communication happens between the authentication server 713 and the user control area 714 through 703 through 708.

Figure 8:
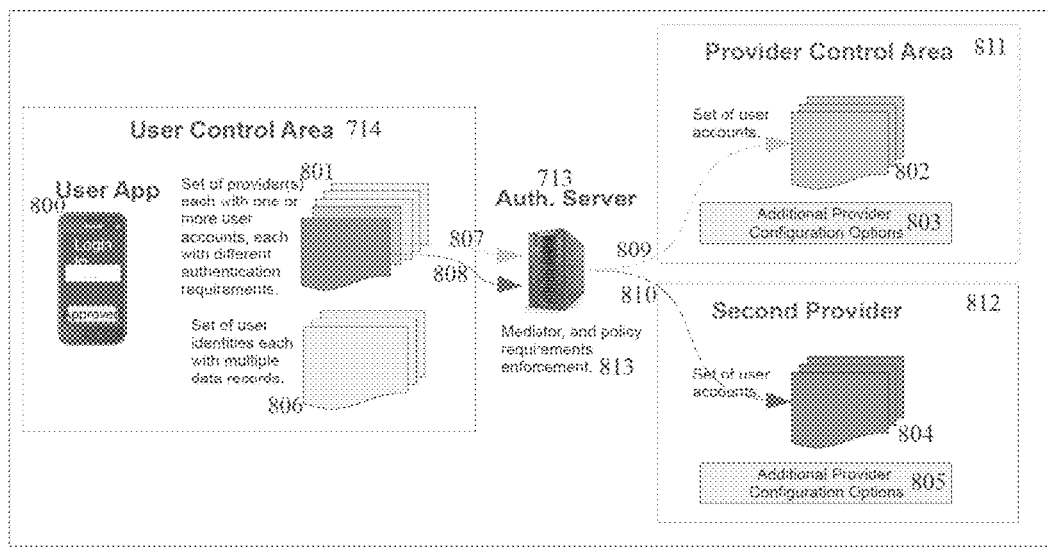
FIG. 8. Illustrates the data control areas for various pieces of data within the system.

FIG. 8 illustrates the ability of the user app 800 to maintain multiple accounts across one or more providers 801 and multiple sets of identities 806. Account information also includes the user's authentication requirements. The user identities 806 may include multiple data records. The authentication server 713, as discussed in the policy management section, then mediates authentication requirements between the user and the provider for each account that the user has configured 813. The authentication sever 713 also facilitates communication between multiple user areas and multiple provider areas 811, and 812. For example for the first user/provider pair information flows from the user area 714 through channel 807 to the first provider area 811 over channel 809. The second user/provider pair sends different data over a similar set of channels 808 and 810. The providers each maintain their own set of account data 802, and 804 including the authentication configuration options 803 and 805.

In addition to the architectural pieces there are a set of communications that happen between the different parties. One common interaction with the system is when a user logs into a web site. The following is a high-level view of one embodiment for login.

Figure 2:
FIG. 2. Illustrates an example login screen.
Figure 3:
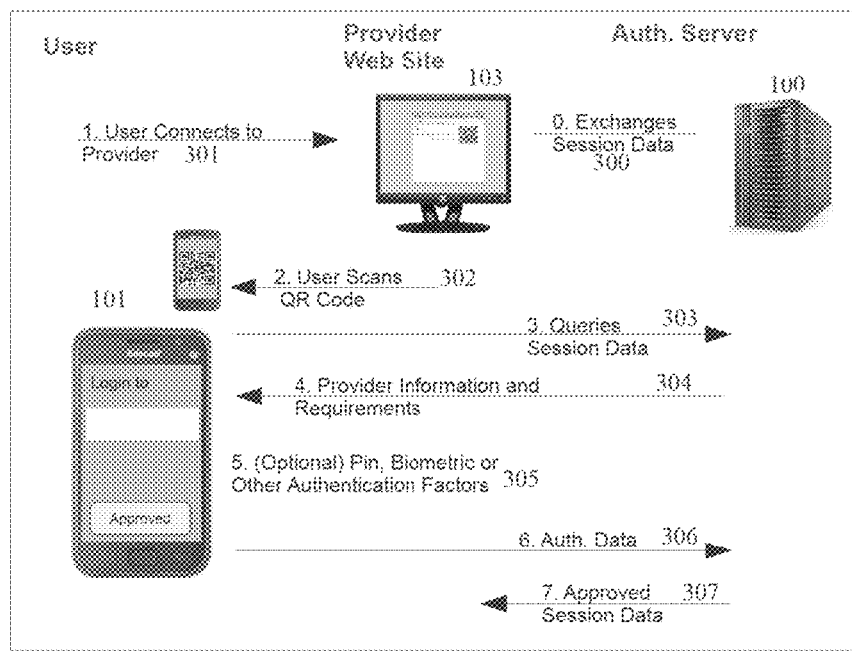
FIG. 3. Illustrates the communication between the user (both browser and mobile phone), the authentication server, and the network provider.
Figure 4:
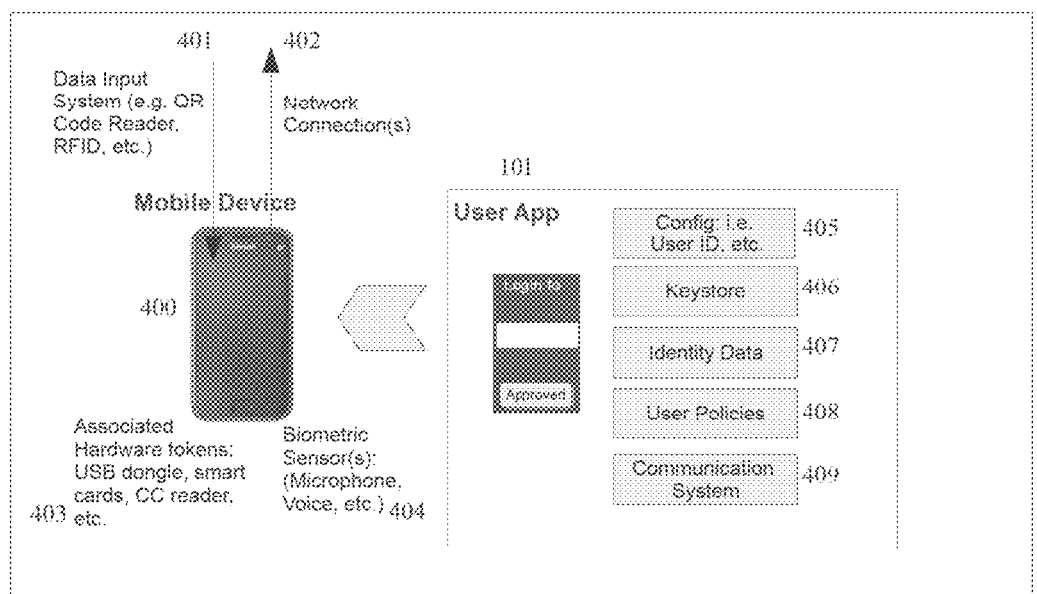
FIG. 4. Illustrates the primary subsystems on the mobile user device.
Figure 5:
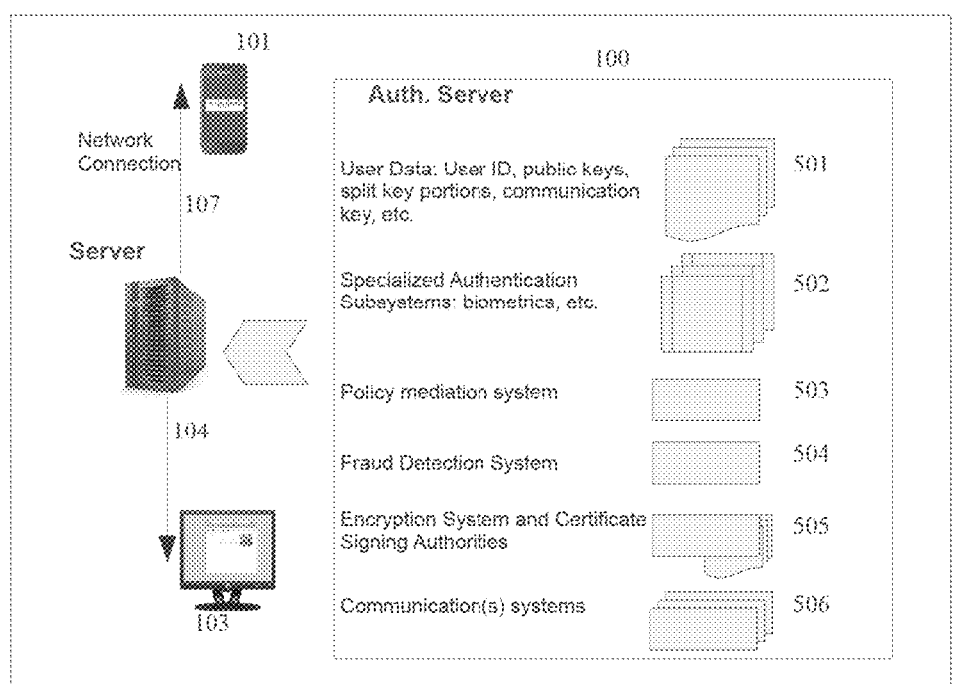
FIG. 5. Illustrates the primary subsystems on the authentication server.

1. The user goes to a web site that implements the present invention's login system. FIG. 2. shows a screen shot of what the login might look like. In addition to the normal account login selection a QR code 200 with the Qcode is displayed. The Qcode includes a header block (described below) and a Session Id (Qsid) which is guaranteed to be unique across all users for as long as the code is valid and acts as a simple identifier for the authentication session.
2. Referring now to FIG. 3, the user, on their smart phone, starts up the Qapp and scans the Qcode 302. This starts a communication 303 with the Authentication Server (Qserver) 100 and, depending on the policies of the user and the Provider which are provided in 304 the user will enter additional authentication information 305 that may include a pin, token data, and/or biometric data. For the purposes of a higher security site, for example PC Banking, the user might go through the following. FIG. 3 shows an example login.
    i. They will see a message saying "Would you like to login to Provider X". This will allow the user to validate that who they are trying to login to is the same location that they are connecting to in 102.
    ii. The user will approve the login and then enter their secret data and if the site 103 requests three-factor authentication they may also need to submit some form of biometric data (such as a picture of their face, hand image, or voice sample).
    iii. The session information, session validation, approval, and the biometric data is then submitted in 306 to the Qserver server 100 for validation. Behind the scenes if the Qserver approves the authentication in 307 and then it will notify the Provider (the site can then do an independent validation of the user's challenge/response) and the users browser gets automatically refreshed and logged in.

3. The user is now logged in—besides scanning the Qcode in 302 they do not need to enter any information or even click on any links on the web site. This makes a virtually transparent, completely automated, and yet secure authentication system.

The following is a high-level view of another embodiment for login. See FIG. 9.

Figure 9:
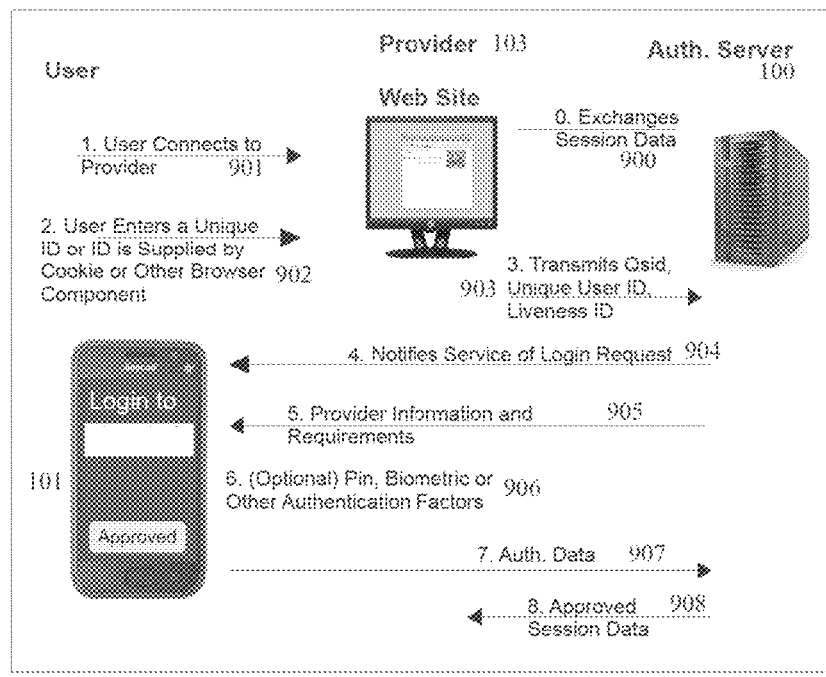
FIG. 9. Illustrates the communication between the user (both browser and mobile phone), the authentication server, and the network provider.

1. The user goes 901 to a web site that implements the present invention's login system. Instead of the traditional username and password fields the web site has a single field for the user to enter their unique user ID 902. The unique ID could be assigned like a username or be something like a phone number. The user then clicks submit and the web site with collaboration from the Qserver assigns a unique session id (Qsid) 900 and starts authentication. In a second embodiment the unique ID might be saved in a cookie or retrieved from the mobile device during access. It is also possible to tie the browser and mobile device together by transmitting from the browser the Qsid or other identifier specific to the session. The transmission could be in the form of a QR code displayed to the user and scanned via the mobile device.
2. The provider communicates the unique user ID and the Qsid to the Authentication Server 903.
3. Based on the unique user ID the authentication server contacts the user's mobile device 904. This communication with the Authentication Server (Qserver) which will include the requirements for authentication 905. Depending on the policies of the user and the Provider the user will enter additional authentication information that may include a pin, token data, and/or biometric data 906. FIG. 9, which shows an example login as in FIG. 3 described above, also shows the completion steps 907 and 908 to finish the login.
4. The user is now logged in—besides providing their unique user ID, they do not need to enter any information or even click on any links on the web site. This makes a virtually transparent, completely automated, and yet secure authentication system.

Specific Security and Architectural Issues

The Qcode includes the following information: a header tag which specifies that this is an authentication token for the present invention, and a Qsid which is long enough to make guessing virtually impossible, guarantee uniqueness within the environment, and long enough to make reuse of the Qsid happen infrequently. In one embodiment, the Qsid is a random number at least 128-bits long. Optionally, the Qcode may include session specific information like the type of login/enrollment requested, or alternate authentication server.

In addition to the Qsid, there is a liveness ID (Qliveness) which is another piece of information passed from the Provider, through the Qserver to the Qapp. In one embodiment, the Qliveness is a random number generated by the Provider. The Qliveness provides two main security functions 1) makes it harder to reuse Qsid as an attacker would need to know both the Qsid and the Qliveness numbers, and 2) makes it impossible for the Qserver to replay attacks since the Provider can choose the Qliveness. In one embodiment, it is a configuration option if the Provider wishes to create the Qliveness random number or trust the Qserver.

In a second embodiment the user's access software (i.e. browser for web services) also has a plug-in or other technique for validating the user is at the Provider (i.e. web-site) that registered the Qsid. This plug-in could be used to exchange information securely between the Qapp and the user's browser. This might include validation of the URL, session keys, or other information for signing and/or securing communication. For a man-in-the-middle attack where a user has gone to the wrong site (from a spam link, mis-typed the URL, etc) and believe they are at the Provider's web site but instead are at a site run by an attacker, the only assured method to alert the user to their mistake is to validate at the browser the User's intention with the Qserver. This can be done as a browser plug-in or standalone program on the desktop.

In different embodiments, some or all of the user credentials stored on the smart phone are stored in an encrypted key-store which includes the private keys and certificates used to communicate with Providers or potentially other users. User credentials could include any information or token to validate a user including public/private key pairs, passwords, biometric templates, one time password seeds, etc.

To decrypt the keystore one embodiment uses a unique split key system to prevent brute force guessing of the decryption key 601 and 606 if the keystore is lost, and prevent the Qserver from having access to the keystore. See FIG. 6. The present invention includes the following split key system: where a user enters secret data is split into multiple portions, where one embodiment is to use 2 portions: A and B. The secret data can be any type of user data including: password, pin, biometric template, an image drawn by the user, etc. The A portion of the password is used locally to create the A portion of the decryption key 605. In various embodiments the A portion might be used to decrypt another block on the local system, it might be combined with system information like the smart card's unique serial number, or it might be hashed or otherwise modified to make the A portion longer or more obscure to decode. Since the A portion never leaves the phone the user maintains control over the decryption key. The B portion of the secret data 602 is sent to the Qserver over an encrypted and authenticated channel (using the user's communication key), and the Qserver sends back the B portion of the decryption key 604. In different embodiments the B portion of the key might be looked up from a database, created as a hash from the B portion of the secret data, or combined other user/hardware specific information. Since the Qserver can monitor the use of the B portion it is possible to lock the account after a set number of failed attempts, alert the user, or otherwise respond to suspicious behavior 603.

In one embodiment, the user credentials are based on a public/private key and certificate system (PKI). The benefits of this system are that the user's credentials, the private key, never leave the smart-phone and the certificates can be signed and validated into the system at enrollment. These certificates can be handed out and controlled individually, allowing users to authenticate with separate credentials to each Provider. In addition other pairs of credentials for example user-to-user credentials can also be created and maintained separately. One embodiment uses three different types of certificates which are signed by three different signing authorities: 1) Provider Certificate Authority (CA)—signs provider certificates for use in communicating between the Provider and the Qserver, 2) User CA—signs the user communication certificates and the user-to-provider certificates created by the user for use in validating their credentials with a Provider. And 3) Qserver CA—signs the certificates used on the Qservers to validate to the user and provider that they are talking to a legitimate Qserver. In a second embodiment, the user might have a single user-toall-providers certificate, and the signing authorities could be consolidated into a single CA or hierarchical CA configuration.

In the present invention it is possible for the user to use multiple forms of authentication data including biometrics. The current state-of-the-art in authentication systems combine some form of knowledge, biometric, and token factors; provisioning for just one of these factors is complex without the present invention. Because smart phones and other types of mobile devices have multiple sensors and other data input methods it is possible to collect data from all traditional authentication types:

Something you are: includes biometric options like face recognition taken from a front facing camera, hand recognition taken from a rear facing camera, speaker recognition taking from the microphone, etc. Some phones have specialized inputs build in like fingerprint readers, and devices can often be attached to the smart phone allowing additional capabilities.

Something you know: includes passwords, security questions, the phrase spoken during speaker recognition, an image drawn on the screen, a phone shaking pattern, etc.

Something you have: the most obvious is the phone or mobile device itself. But this category can also include tokens associated with the phone for example: attached usb devices, tokens discovered via near-field radio options, card data read off of card readers, data from the SIM card of the device, secure data stored on the device itself in a secure co-processor or data lockbox, etc.

The present invention allows the Provider and user to use one or more types of authentication giving flexibility and additional security where needed on a individualized basis. The Qserver manages additional factor security including: enrollment of various biometric or token options, storage of security data like biometric templates, fraud detection targeted at the different forms of authentication, and comparing login authentication to the enrolled data. The Qapp manages collecting the authentication data and may do a set of pre-processing steps on the data before submission to the Qserver. The pre-processing is primarily directed at ensuring the quality of the submission to give the user feedback quickly if the image is out-of-focus, not received etc. but the pre-processing is also used to limit the size of data sent and potentially clean up submitted data (align the head to the center of the image, etc.). The Qapp may also have a set of fraud detection functions which are done in addition to the main fraud detection done on the Qserver. Even though the Qserver maintains the additional authentication factors, since the Qserver does not have access to the keystore 406 the Qserver cannot pretend to be a user. This separation of trust allows centralized control and management without compromising the user's control over their own authentication. Another benefit of this architecture is new forms of authentication can be rolled out to users without the need for the Provider to change anything.

The architecture of the present invention also allows simplified provisioning when Providers want to add new users. There is no need for the Provider to pre-configure the authentication data, for example there is no need to assign temporary passwords. This also allows the Provider to have greater flexibility in the types of authentication policies they want to support. For example if the Provider wants to upgrade the authentication to require 2-factor, they simply change the global policy on the server and users will start being required to authenticate with 2-factors. The Provider does not need to go back to each user trying to collect enrollment data for the new factor that is all handled by the Authentication Server. When combined with simplified identity and enrollment, there is no need for Providers to pre-configure any account on their systems.

In one embodiment, it would be possible to replace a traditional user with an automated process, like batch system that need to authenticated to a variety of services across a network. Although the system would work the same certain optional components like biometric authentication or knowledge based authentication factors would not be possible.

The present invention also allows a secure form of communication between the Provider and the User via the secure channel through the Authentication Server and the Qapp on the user's mobile device. This secure communication channel would allow Provider's to send critical notifications in a trusted manner allowing information like "you have made a purchase" or "you have transferred money" to be transmitted in a manner that cannot be spoofed or modified. The encryption keys for the data could be based on any standard including the public certificates previously exchanged between the parties or previously shared session keys. This type of communication would also allow secure communication between any two users on the network using a pre-established user-to-user credential.

Unidirectional requests like "you have made a purchase" would not require a response from the user, but bidirectional requests like "are you sure you would like to purchase X" would allow the Provider to wait for a response from the user. Thus allowing the user to validate transactions through the secure communication channel before they are finalized. The verification process could occur even if the user is not currently logged into the Provider and could involve the user "approving" the transaction while simultaneously providing additional authentication data.

Detailed Sample Embodiment of the Login Process-See FIG. 3

User goes to the web site via a desktop or mobile browser 301.

Web Site 103 (Provider) gets, over channel 104, a Session Id (Qsid) 300 from the Authentication Server 100 and locally creates a session-specific random number (Qliveness) 300. The Provider could pre-cache for performance reasons a set of Qsids from the Qserver. The Qliveness could be generated on the Authentication Server (with some increased security risk). If the Qliveness codes are generated by the Provider, it will send the Qliveness codes to the Authentication Server as the Qsid is handed out.

The Provider shows the Qsid incorporated into the Qcode displayed to the user. The Qcode can be generated by the server and shown as an image or transmitted to the browser and displayed as an image created by the browser side Javascript. The Qsid should be encrypted using SSL or other transport encryption to prevent race conditions if a third party steals the Qsid. In at least some implementations, the user enters or otherwise provides via the browser their unique user ID to the Provider, and initiates the login process. The Provider then sends the unique user ID, the Qsid, and the Qliveness to the Authentication Server over an encrypted channel.

In the background, the User's browser continuously polls the Authentication Server over an encrypted channel 105 with the Qsid to identify when the authentication is complete.

User scans the Qcode with their Authentication Application (Qapp) 302. The user may or may not need to enter their secret data before starting the Authentication Application (based on Qapp policies). The Qapp decodes the Qcode, makes sure it is a proper code and then extracts the Qsid.

The Qapp connects to the Authentication Server over client-authenticated SSL (so that the Qserver can verify the Qapp user); verifies the Authentication Server's certificate, and then sends the Qsid step 303.

The Authentication Server sends back to the Qapp the session data 304 (or, if the prior two bullet steps are not performed, the Authentication Server, based on the unique user ID, connects to the user's mobile device and Qapp, over a bi-directional authenticated SSL connection, sending a login request with the session data) which includes:

The Qliveness number and the type of session (login or enrollment).

The Distinguished name, the Logo, and a readable name of the Provider the user is attempting to connect to. Optional embodiment would send the Provider's certificate and Qliveness signed with the Provider's key, allowing Provider validation but requiring higher CPU overhead.

The authentication policy of the Provider required (none, password, biometric, etc.)

The Qapp checks the user's permissions 408 and 405 (do they want to always be notified, always type their password, etc.) combined with the Provider's authentication policy and then asks the user for the appropriate information 305. For the example, assume the user needs to enter a password and biometric data for three factor authentication.

User enters their secret data into the Qapp.

Qapp sends the network component of the secret data to the Authentication Server—over the encrypted and validated channel.

The Authentication Server—validates the network Component of the secret data, does fraud detection to prevent brute force guessing and other types of attacks, and then sends back the B half of the decryption key for unlocking the keystore on the user's phone.

The Qapp receives the B half of the split key, combines it with the A half of the secret data and potentially other information from the phone which is not security relevant (for example the unique ID of the device, etc.) and uses the combined key to unlock the secure keystore in the application. The keystore contains a private key for each Provider the user communicates with.

The Qapp then prompts to the user for any additional biometric data required (for example a hand image).

The Qapp then sends the full authentication packet back to the Qserver 306. Including:

The Qsid—The session ID.

The user id, Qid, is embedded in the communication certificate and can be obtained by the Qserver based on the client-authenticated SSL connection. In different embodiments, the Qid could be unique per user/Provider pair or could be unique per Qapp installation.

The Qsid and Qliveness signed by the User's certificate for the specific Provider.

The raw biometric data (for example the jpg image of their face or hand)

The Authentication Server then validates the user package including checks for

The User Communication Certificate is valid. We make sure the certificate has not been revoked (when a user losses their phone this may happen), is current (certificated will expire and need to be refreshed), and actually exists (new users or attackers would not have a valid certificate).

The Qsid is valid. This may include checking for attacks (such as an attacker trying to reuse a Qsid) or brute force scans (such as an attacker sending a random Qsid); and will also include checks to make sure it has not expired, the mapping to a site is valid, etc.

The user has an account with the Provider mapped by the Qsid. A mapping exists from the Qid to the Provider registered with the Qsid. If the user does not have an account, the Authentication Server will send back a "you're not registered with that site message" to the user. This type of check is one of the methods that is used to invalidate phishing attacks.

Biometric data is verified against data previously enrolled by the user. The Biometric data may or may not have a variety of fraud detection steps performed.

The signed Qsid and Qliveness are valid and signed by the correct certificate.

The Authentication Server (which is being polled by the user's original browser) sends back a valid login signal to the user browser.

The browser connects to the Provider's received authentication approval location.

The Provider then connects to the Authentication Server (over an encrypted and validated channel) asking for confirmation of the approval 307. The Authentication Server sends back "received a valid login" to the Provider including the following data (Note the preferred method specifically does not send the biometric data or other authentication data to the Provider): the user certificate which includes the Qid, the signed Qsid and Qliveness, the validity of the authentication passed to the Qserver (for example user authenticated successfully with pin and face).

Optionally, the Provider can then approve or reverify the signature based on local policy and can perform additional security checks on the certificate including matching the login certificate against the enrollment certificate. Once approved, the user is logged into the web site.

Detailed Sample Embodiment of the Enrollment Process

1) User Enrollment to the Qserver

The user downloads the Qapp onto their smart phone. When the Qapp is first started the user can create a new account or enroll into the system:

1. User enters various registration information, which may include name, phone number, e-mail, etc.
2. Optionally, user enters biometric enrollment data like face images, voice prints, password, etc.
3. User clicks "submit" and Qapp sends a request for User ID (Qid) to the Qserver. The request may include various portions of the registration data for example e-mail address to verify the user is not already enrolled and optionally to perform out-of-band validation (like sending the user an e-mail).
4. The Qapp receives back from the Qserver a unique user id (Qid) and the public certificate of the Qserver. The Qapp creates a unique public/private key pair, user communication certificate (which includes the Qid), and a certificate signing request.

5. The Qapp then sends the enrollment data to the Qserver including: the certificate signing request, the registration data, and any biometric data.
6. Assuming the Authentication Service approves the submission, The Authentication Service sends back a signed certificate of the user's communications key and enrolls the user data into the system. This information is then saved in the Qapp.

2a) User Enrollment to Provider

When user connects to a Provider service and chooses to enroll they will be presented with the Provider's existing enrollment page, including any information needed to be supplied by the user, and a Qcode.

The first part of the enrollment process is the same as the login process. It diverges when the Qapp receives back the session data and it includes the identifier that this is an enrollment session.
  The Qapp shows the user a message to approve enrollment "Provider X is requesting enrollment". If the user approves, the Qapp requests the user to enter any additional authentication required (for example face recognition, etc.).
  The Qapp creates a public/private key pair for use between the User and the Provider.
  The Qapp sends off a certificate signing request.
  The Authentication Server validates parameters and biometrics, as appropriate; and signs the certificate signing request.
  The Authentication Server then sends back to the Qapp: (optional) public certificate for the Provider; and signed certificate for user. The Authentication Server then associates the certificate with the (user, Provider) pair.
  The Qcode image or other visual display on the original browser page will be updated to show successful enrollment. The user can now submit their enrollment to the provider.
  Provider validates session based on session ID and if is successfully validated saves users public certificate and User ID (Qid). If the session ID is not valid it could just be a user enrolled on the Provider site without using the authentication server, so the session ID was never used.

2b) Secondary Enrollment Embodiment—Addition of Identity

One way to make user enrollment at a Provider site easier on the user is to simplify the amount of information the user has to re-enter. See FIG. 8. The present invention allows the user to create one or more "Identities", for example business and personnel identities 806. Each Identity has a set of data for example name, e-mail address, mailing address, etc. that is associated with the Identity. The user during enrollment then has the option of using information from an Identity to fill out Provider enrollment information. This simplified enrollment option could be triggered when a user scans a login Qcode or enters their unique user ID into the Provider's form, and the Qserver recognizes they do not have an account. In one embodiment, the identity information can be stored on the Qserver and in a second embodiment the identity could be stored exclusively on the mobile user device. Additional, the management of the identity information could be performed locally to the storage of the information or done with remote agreement on another server or device: including a server, the authentication server, the user's desktop computer, etc.

The first part of the enrollment process is the same as the login process. It diverges when the Qapp receives back the session data and it includes the identifier that this is an enrollment session.
  The Qapp shows the user a message to approve enrollment "You do not have a login for Provider X would you like to enroll?". The type of enrollment information required by the Provider (name, date of birth, etc.) is sent as a set of properties to the Qapp by the Qserver. The Qapp then shows the user a message like "To enroll Provider X would like the following information: name, email, etc.". The user can then select from their set of Identities which one they would like to use for the Provider and the required fields would be filled in using the pre-configured Identity data. Optionally the user may be given the choice to edit the data before being submitted. The user maintains complete control over the data submitted and yet can do a click to enroll process—potentially never having to type in any new data.
  The enrollment process then proceeds normally.

3) Provider Enrollment to the Qserver

This is expected to happen much less frequently than user enrollment and as such the signing key and process can be more manual. It essentially follows the same steps above except the Provider creates their key (using provided scripts) and saves the data that is returned as part of their provider configuration. The Provider receives back the Authentication CA and the User CA certificates.

Detailed Sample Embodiment of the Lost Phone Process
    See FIG. 7. Because users certificates are validated before login, by using the proposed system, when a user reports a phone lost 705; all the certificates can be immediately invalidated. This can also be used if fraud is detected or the user thinks their phone may have been compromised. To help assist the user not only are the keys revoked but the Qserver service can be used to simplify and manage re-enrollment with their old providers (in fact it is not necessary for the providers to do anything if they trust the Qserver to revalidate the user). In different embodiments, the methods of invalidating the credentials include key revocation, deletion, or invalidating the data.
    The user reports their phone lost by calling or logging into the Qserver web site. They can use the B half of the secret data or if they have a new phone login with biometric options.
    The Authentication Service revokes (or marks as revoked all the user's keys).
    If a user tries to login with an revoked key the login is denied.

Revalidation

When a user goes to reset up their account, on the Qapp they select "Login to Existing Account" and give the details for login including e-mail address, biometrics, and network portion of the secret data. The appropriate information is sent onto the Authentication Server for validation to ensure that the biometrics and other login information is correct.
  If the authentication is valid then the Authentication Server sends back the user's old User ID (Qid). The normal enrollment continues with the Qapp creating a key pair, certificate, etc.
  Then when a user tries to login to a site they used to have credentials on, they follow the normal login process except that the Authentication Server sees that no current credentials are found for the user, yet they have revoked credentials, and contacts the Qapp to create new credentials. Once the credentials are created the user's original browser is contacted and told the user is doing a re-enrollment. By using a browser return code to notify the browser the redirection can happen automatically to the user. The ability to give the user a completely transparent re-enrollment option is enabled by the authentication framework, and the specialized communication between the browser and the provider. This gives the provider the opportunity to redirect the user to a re-enrollment page where the provider can ask additional questions to re-verify the user (for example Favorite Pet's Name, etc.). The provider can also choose to skip this step and just accept the new credentials. Once the credentials are accepted the user logs in. The Authentication Server is also contacted by the provider to "accept" the new credentials.

Detailed Sample Embodiment of the Policy Configuration

There are a number of policy options and configurations that the Provider and User can select. Each effects slightly the steps taken to login or validate a login process. For example the Provider can specify that the user's key should be stored in an encrypted key store or that the user is required to use two-factors to login. The User can also specify if keys should be stored encrypted. The Qapp selects the minimal settings that meet both the User and Provider specifications. This means that each of the user related options acts as an "upgrade" to the security. The policy management can be distributed for example the Qapp or the Qserver can be used to change user policies. Whereas the Qserver or the Provider might have access to change provider policies. In one embodiment, only the provider can update provider policies. In one embodiment only the Qapp can change the user policies. In another embodiment, the user could change their policies from an interface, like a web site, on the Qserver. In the present invention users are given control over their individual policy information and records, rather than having an administrator or super-user who is responsible for maintaining a multitude of individuals records.

User Policies:
  Encrypt all keys. This will require the user to enter their secret data, whenever the Qapp starts on the system.
  Allow authentication to remain valid (i.e. stored in memory) for a set period of time. This allows the user to limit the number of times they enter their secret data or take an image of their, possible settings include: every time the screen saves, or maybe every hour. Specific biometrics or specialty tokens may have their own maximum time frames to remain valid.
  The User can directly manage (either on the Qapp application or on the Qserver web site) the policies for specific keys 801. This would include "upgrading" specific sites to require more authentication. For example, if the provider currently requires two-factor (the phone and your secret data), the user can upgrade the requirement to add a biometric factor so that now for that User their account on the specific provider cannot be accessed without providing three-factor authentication.
  In another embodiment the user could select to receive Provider certificates and Qliveness signature blocks and validate the signatures at the Qapp.

Provider Policies

The present invention includes configuration options which allow the provider to trust the Qserver and skip most of the provider checks or allows the Provider to revalidate everything from the user (except the additional authentication factor(s)). The following are some of the major settings which can be used on the Provider:
  Revalidate the user credentials. This includes: validating that the user credentials are the same as was approved during enrollment; the certificate has not expired; and the signed data returned during authentication was signed using the previously agreed certificate.
  Creating their own Qliveness rather than having the Qserver create it when the Qsid is obtained. (This prevents replay attacks being run by a Qserver).
  Turning on or off re-enrollment. This allows the Provider to ask the user re-verification questions if they lose their key and have to be re-enrolled. If turned off the Provider trusts that the Qserver has done the authentication verification.
  Use a cookie given to the user's browser when they first connect to the Provider to validate that the browser that saw the Qcode is the same one that logged in.

4) Existing User Enrollment to Provider with Paper

One benefit of using a Qsid transmitted to the user's mobile device through a QR code is that the initial enrollment for existing Provider accounts can be done via a mailer or paper initiation. The benefits of this are that the enrollment process could be initiated via a Provider statement (like an account statement or utility bill) or during initial setup (like when you go to open a bank account or get a home loan). See FIG. 10. Under this enrollment process the following steps would occur:

When the provider is setting up the account or wishes to enroll an existing user they print on a piece of paper 1000 a Qcode 1008 that is unique allowing the user and Provider account to be correlated through the Authentication Server. The Qcode includes a header block (described below) and an Enrollment Id (Qeid) agreed upon by the server 1001, which is guaranteed to be unique across all users for as long as the enrollment code is valid and acts as a simple identifier for the enrollment session.
  User scans 1002 the Qcode with their Authentication Application (Qapp) 101. The user may or may not need to enter their secret data before starting the Authentication Application (based on Qapp policies). The Qapp decodes the Qcode, makes sure it is a proper code and then extracts the Qsid.
  The Qapp connects to the Authentication Server over client-authenticated SSL (so that the Qserver can verify the Qapp user); verifies the Authentication Server's certificate, and then sends the Qeid 1003.
  The Authentication Server sends back to the Qapp the session data 1004 which includes:
    The Qliveness number and the type of session (login or enrollment).
    The Distinguished name, the Logo, and a readable name of the Provider the user is attempting to connect to. Optional embodiment would send the Provider's certificate and Qliveness signed with the Provider's key, allowing Provider validation but requiring higher CPU overhead.
    The authentication policy of the Provider required (none, password, biometric, etc.)
  The Qapp shows the user a message to approve enrollment "Provider X is requesting enrollment". If the user approves, the Qapp requests the user to enter any additional authentication required 1005 (for example face recognition, etc.).
  The Qapp creates a public/private key pair for use between the User and the Provider.
  The Qapp sends off a certificate signing request and other optional authentication information 1006.

The Authentication Server validates parameters and biometrics, as appropriate; and signs the certificate signing request.

The Authentication Server then sends back to the Qapp: (optional) public certificate for the Provider; and signed certificate for user. The Authentication Server then associates the certificate with the (user, Provider) pair.

The Authentication Server then sends the enrollment information including newly generated user-provider certificate to the Provider 1007. The Provider may be contacted through any number of architectures including the Provider continuously polls the Qserver, they are connected continuously, or the Qserver has the ability to directly connect to the Provider. The Provider validates the session based on the enrollment ID and if is successfully validated saves users public certificate and User Account ID (Qid).

The user is then enrolled into the authentication system, without typing any additional validation information, and can now login with simplified multi-factor authentications. In a second embodiment the Provider may request additional information be entered by the user on first use—similar to the re-enrollment process there by providing another layer of validation.

Figure 11:
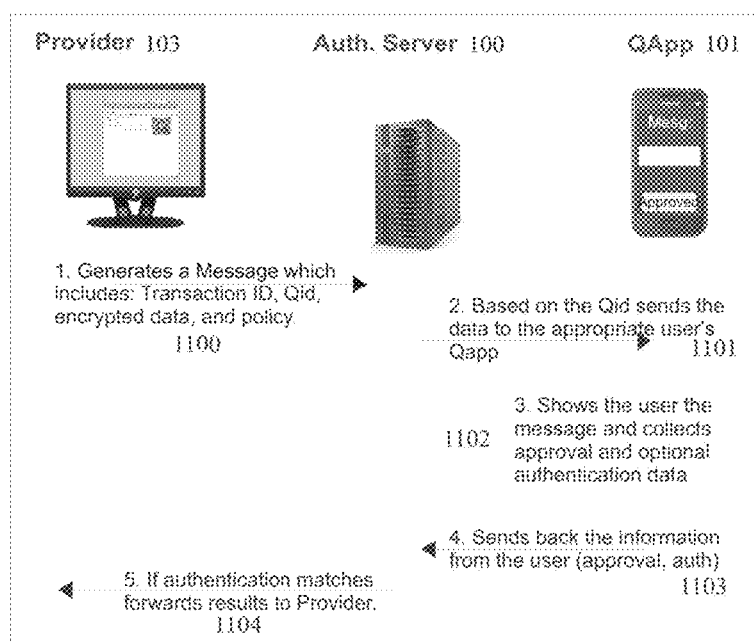
FIG. 11. Illustrates a sample communication flow for the notification system.

Detailed Sample Embodiment of the Notification Process
1) Provider Sends a Message to a User Once the user-provider relationship has been configured (through the enrollment process) the Provider has a unique User Account ID associated with the specific user account. See FIG. 11. If an event occurs at the Provider which should be validated or messaged to the user the following process would occur:

The Provider send to the Qserver the User's Account ID (Qid), a transaction ID, and a message, which can be encrypted with the user's certificate already stored at the Provider and signed by the Provider certificate, message 1100. The request would also include a header specifying if the user needs to approve the transaction, and if any authentication is required for approval. The transaction ID will be used to later identify the specific transaction to verify delivery or approval. In a second embodiment the Qsid of an already logged in user could be used instead of the Qid to correctly identify the user for the message.

The Qserver initiates a connection to the user mobile device Qapp 1101. The connection initiation could occur over a push mechanism, an open network port, initiated via SMS, or the Qapp could poll or stay connected to the Qserver regularly depending on the mobile device architecture and services available.

The Qserver sends the Qapp a message request including the Transaction ID, message block, and policy requirements. The Qapp then decrypts the message, shows the message to the user, if required obtains approval and additional authentication information for validation 1102.

The Qapp then generates a response and sends it back to the Qserver 1103 which forwards it back to the Provider 1104. The response may include the user's approval answer, additional authentication information, and verification that the message was shown. In one embodiment the Provider may poll the Qserver continuously for responses to one or more messages. In a second embodiment the user's browser would poll the Qserver after the user initiated a transaction that required verification, and when completed the browser tells the Provider to check the status of the notification.

In a third embodiment the Qserver directly connects to the Provider. This same process could be used to share messages between two users that have accounts on the Qserver and have already exchanged certificates.

We claim:

1. A method of operating an authentication server to notify a network entity of a transaction via a network, comprising:

receiving, by the authentication server from a first network entity via the network, an identifier of a second network entity, a transaction identifier, transaction approval and authentication requirements, and a message regarding the transaction, wherein the message is encrypted with a credential of the second network entity;

transmitting, by the authentication server to the second network entity via the network, the received transaction identifier, transaction approval and any authentication requirements, and encrypted message;

receiving, by the authentication server from the second network entity via the network after transmitting the transaction identifier, transaction approval and authentication requirements, and encrypted message, at least one of a transaction approval and authentication information;

determining, by the authentication server based on any received authentication information, that the second network entity is authentic; and transmitting, by the authentication server, to the first network entity a notification of any determination and any received transaction approval.

2. The method of claim 1, wherein the second network entity identifier is a unique user account identifier that the first network entity associates with a user account of the second network entity.

3. The method of claim 1, wherein the message is also signed with a private key of a private/public key pair of the first network entity, and a public key of the first network entity private/public key pair is known to the second network entity.

4. The method of claim 1, wherein the second network entity credential is a public key of a private/public key pair of the second network entity that is known to the first network entity.

5. The method of claim 1, further comprising:

after receipt of the second network entity identifier, the transaction identifier, the transaction approval and authentication requirements, and the encrypted message, receiving a query message from the first network entity via the network, wherein the notification of any determination and any received transaction approval are transmitted to the first network entity in response to the received query message.

6. The method of claim 1, further comprising:

prior to transmitting the received transaction identifier, transaction approval and any authentication requirements, and encrypted message, receiving a query message from the second network entity via the network, wherein the received transaction identifier, transaction approval and any authentication requirements, and encrypted message are transmitted in response to the received query message.

7. The method of claim 1, further comprising, after transmitting the transaction identifier, transaction approval and authentication requirements, and encrypted signed message, and prior to receiving the at least one of transaction approval and authentication information:

receiving, from the second network entity via the network, a portion of secret data of the second network entity;

applying the received portion of secret data to obtain a portion of a symmetric decryption key for decrypting credentials of the second network entity which are required to obtain the at least one of transaction approval and authentication information; and transmitting, to the second network entity via the network, the obtained portion of the symmetric decryption key.

8. A network server for notifying a network entity of a transaction via a network, comprising:

a data store configured to store authentication information for authenticating network entities;

a processing unit configured to (1) receive, by an authentication server from a first network entity via the network, an identifier of the second network entity, a transaction identifier, transaction approval and authentication requirements, and a message regarding the transaction, wherein the message is encrypted with a credential of the second network entity, and (2) direct transmission, by an authentication server to the second network entity via the network, of the received transaction identifier, transaction approval and any authentication requirements, and encrypted message, (3) receive, by an authentication server from the second network entity via the network after transmitting the transaction identifier, transaction approval and authentication requirements, and encrypted message, at least one of a transaction approval and authentication information, (4) determine, by an authentication server based on any received authentication information and the stored authentication information, that the second network entity is authentic, and (5) direct transmission, by an authentication server to the first network entity, of a notification of any determination and any received transaction approval.

9. The network server of claim 8, wherein the second network entity identifier is a unique user account identifier that the first network entity associates with a user account of the second network entity.

10. The network server of claim 8, wherein the message is also signed with a private key of a private/public key pair of the first network entity, and a public key of the first network entity private/public key pair is known to the second network entity.

11. The network server of claim 8, wherein the second network entity credential is a public key of a private/public key pair of the second network entity that is known to the first network entity.

12. The network server of claim 8, wherein:

the processing unit is further configured to receive a query message from the first network entity via the network, after receipt of the second network entity identifier, the transaction identifier, the transaction approval and authentication requirements, and the encrypted message; and wherein the notification of any determination and any received transaction approval are directed to be transmitted to the first network entity in response to the received query message.

13. The network server of claim 8, wherein:

the processing unit is further configured to receive a query message from the second network entity via the network, prior to transmitting the received transaction identifier, transaction approval and any authentication requirements, and encrypted message; and the received transaction identifier, transaction approval and any authentication requirements, and encrypted message are directed to be transmitted in response to the received query message.

14. The network server of claim 8, wherein after directing transmission of the transaction identifier, transaction approval and authentication requirements, and encrypted signed message, and prior to receiving the at least one of transaction approval and authentication information, the processing unit is further configured to:

receive, from the second network entity via the network, a portion of secret data of the second network entity;

apply the received portion of secret data to obtain a portion of a symmetric decryption key for decrypting credentials of the second network entity which are required to obtain the at least one of transaction approval and authentication information; and direct transmission, to the second network entity via the network, of the obtained portion of the symmetric decryption key.

15. An article of manufacture for authenticating a network user to another network entity, comprising:

non-transitory storage medium; and logic stored on the storage medium, wherein the stored logic is configured to be readable by a processor and thereby cause the processor to operate so as to:

to notify a network entity of a transaction via a network, comprising:

receive, by an authentication server from a first network entity via the network, an identifier of a second network entity, a transaction identifier, transaction approval and authentication requirements, and a message regarding the transaction, wherein the message is encrypted with a credential of the second network entity;

transmit, by an authentication server to the second network entity via the network, the received transaction identifier, transaction approval and any authentication requirements, and encrypted message;

receive, by an authentication server from the second network entity via the network after transmitting the transaction identifier, transaction approval and authentication requirements, and encrypted message, at least one of a transaction approval and authentication information;

determine, by an authentication server based on any received authentication information, that the second network entity is authentic; and transmit by an authentication server to the first network entity a notification of any determination and any received transaction approval.

16. The article of manufacture of claim 15, wherein the second network entity identifier is a unique user account identifier that the first network entity associates with a user account of the second network entity.

17. The article of manufacture of claim 15, wherein, the message is also signed with a private key of a private/public key pair of the first network entity, wherein a public key of the first network entity private/public key pair is known to the second network entity.

18. The article of manufacture of claim 15, wherein the second network entity credential is a public key of a private/public key pair of the second network entity that is known to the first network entity.

19. The article of manufacture of claim 15, wherein:

the stored logic is further configured to cause the processor to operate so as to receive a query message from the first network entity via the network, after receipt of the second network entity identifier, the transaction identifier, the transaction approval and authentication requirements, and the encrypted message; and the notification of any determination and any received transaction approval are transmitted to the first network entity in response to the received query message.

20. The article of manufacture of claim 15, wherein:

the stored logic is further configured to cause the processor to operate so as to receive a query message from the second network entity via the network, prior to transmitting the received transaction identifier, transaction approval and any authentication requirements, and encrypted message; and the received transaction identifier, transaction approval and any authentication requirements, and encrypted message are transmitted in response to the received query message.

21. The article of manufacture of claim 15, wherein, after transmitting the transaction identifier, transaction approval and authentication requirements, and encrypted signed message, and prior to receiving the at least one of transaction approval and authentication information, the stored logic is further configured to cause the processor to operate so as to:

receive, from the second network entity via the network, a portion of secret data of the second network entity;

apply the received portion of secret data to obtain a portion of a symmetric decryption key for decrypting credentials of the second network entity which are required to obtain the at least one of transaction approval and authentication information; and transmit, to the second network entity via the network, the obtained portion of the symmetric decryption key.

* * * * *